United States Patent
Chen et al.

(10) Patent No.: US 9,350,709 B2
(45) Date of Patent: May 24, 2016

(54) SYNCHRONIZING A ROUTING-PLANE AND CRYPTO-PLANE FOR ROUTERS IN VIRTUAL PRIVATE NETWORKS

(71) Applicant: Cisco Technology, Inc., San Jose, CA (US)

(72) Inventors: Lewis Chen, Hong Kong (CN); Warren Scott Wainner, Sterling, VA (US); Guan Deng, München (DE)

(73) Assignee: Cisco Technology, Inc., San Jose, CA (US)

( * ) Notice: Subject to any disclaimer, the term of this patent is extended or adjusted under 35 U.S.C. 154(b) by 93 days.

(21) Appl. No.: 14/246,359

(22) Filed: Apr. 7, 2014

(65) Prior Publication Data

US 2015/0288660 A1    Oct. 8, 2015

(51) Int. Cl.
    *H04L 29/06*        (2006.01)
    *H04L 9/08*         (2006.01)

(52) U.S. Cl.
    CPC ............ *H04L 63/0272* (2013.01); *H04L 9/083* (2013.01)

(58) Field of Classification Search
    CPC .......................... H04L 63/0272; H04L 9/083
    See application file for complete search history.

(56) References Cited

U.S. PATENT DOCUMENTS

| | | | |
|---|---|---|---|
| 6,636,895 B1 * | 10/2003 | Li | H04L 45/02 370/351 |
| 7,234,063 B1 * | 6/2007 | Baugher | H04L 9/0833 380/259 |
| 8,442,230 B1 | 5/2013 | Ng et al. | |
| 8,971,209 B2 * | 3/2015 | Magnuson | H04W 24/02 370/216 |
| 2007/0261112 A1 * | 11/2007 | Todd | G06F 21/577 726/11 |
| 2008/0260151 A1 * | 10/2008 | Fluhrer | H04L 63/04 380/255 |
| 2010/0115606 A1 * | 5/2010 | Samovskiy | H04L 12/4641 726/15 |
| 2013/0132498 A1 * | 5/2013 | Wainner | H04L 67/2847 709/208 |

OTHER PUBLICATIONS

Schmid, Thomas, et al. "A case against routing-integrated time synchronization." Proceedings of the 8th ACM Conference on Embedded Networked Sensor Systems. ACM, 2010.*

* cited by examiner

*Primary Examiner* — Shawnchoy Rahman
(74) *Attorney, Agent, or Firm* — Edell, Shapiro & Finnan, LLC

(57) ABSTRACT

Techniques are presented herein for optimizing secure communications in a network. A router in a virtual private network determines whether or not it has successfully registered with a key server that provides cryptographic keys for routers in the virtual private network. The router stores state information that is indicative of whether or not the router has successfully registered with the key server.

19 Claims, 6 Drawing Sheets

SYNCHRONIZING A ROUTING-PLANE AND CRYPTO-PLANE FOR ROUTERS IN VIRTUAL PRIVATE NETWORKS

TECHNICAL FIELD

The present disclosure relates to optimizing secure communications in networks.

BACKGROUND

Routers are deployed in network environments to manage and route communications between network devices. For example, a network device may send to a router a packet destined for another network device. The router may forward the packet in the network such that the packet is ultimately sent to the destination network device. Network devices may be grouped in subnetworks that, for example, may represent enterprise networks. Network devices in one subnetwork may communicate with network devices in another subnetwork over a public network (e.g., the Internet). However, enterprise networks may require enhanced security for communications between local network devices and network devices in other subnetworks. Thus, the subnetworks communicate by way of a virtual private network (VPN) to enable secure and encrypted messages to be exchanged between network devices in different subnetworks over the Internet.

DESCRIPTION OF EXAMPLE EMBODIMENTS

Overview

Figure 1A:
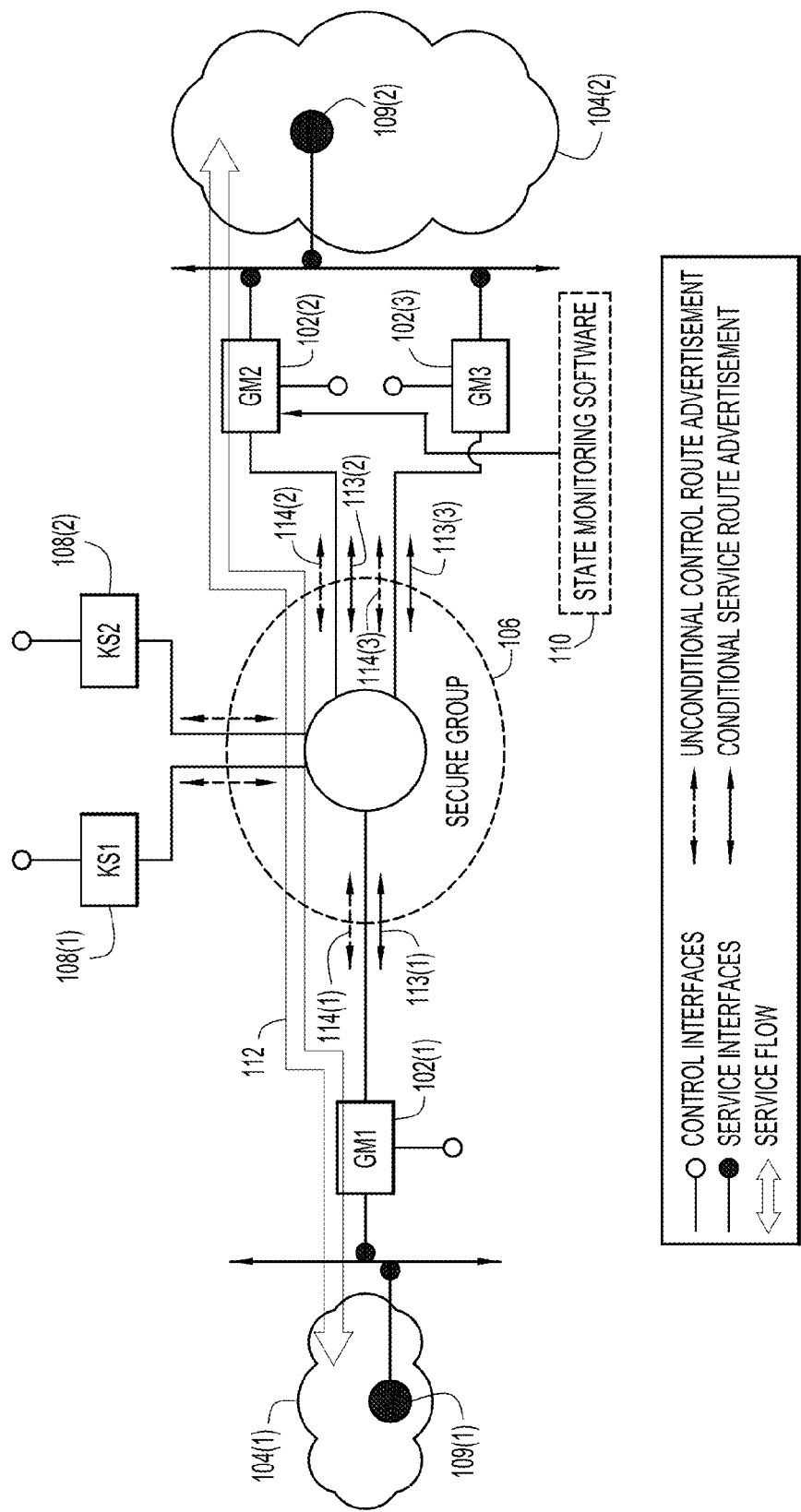
FIGS. 1A-1C show example network topologies depicting a plurality of routers arranged in a private network, according to example embodiments.

Techniques are presented herein for optimizing secure communications in a network. A router in a virtual private network determines whether or not it has successfully registered with a key server that provides cryptographic keys for routers in the virtual private network. The router stores state information that is indicative of whether or not the router has successfully registered with the key server.

Example Embodiments

The techniques presented herein relate to optimizing secure communications in a network. Specifically, these techniques enable synchronization between routing-planes and crypto-planes for router devices in the network. These techniques also enable routing devices to modify service flows between devices in the network. An example system topology ("system") is shown at reference numeral 100 in FIG. 1A. The system 100 may also be referred to hereinafter as a "network."

The system 100 comprises a plurality of router devices ("routers") 102(1)-102(3), a plurality of subnetworks ("subnets") 104(1) and 104(2), a private network 106 and a plurality of key servers 108(1) and 108(2). The routers 102(1)-102(3) are devices that are configured to manage and route communications between network devices in the system 100. The network devices are shown in FIG. 1A at reference numerals 109(1) and 109(2). Network device 109(1) resides in subnetwork 104(1) and network device 109(2) resides in subnetwork 104(2). It should be appreciated that this is merely an example, and any number of network devices may reside in any number of subnetworks.

The routers 102(1)-102(3) are configured to route communications to and from network devices in corresponding subnetworks. In FIG. 1A, subnetwork 104(1) is also referred to as "subnetwork 1" or "subnetwork 1," and subnetwork 104(2) is also referred to as "subnetwork 2" or "subnetwork 2." Additionally, network device 109(1) is referred to as "network device 1" and network device 109(2) is referred to as "network device 2." In an example, router 102(1) is configured to route communications to and from network devices in subnetwork 1, and routers 102(2) and 102(3) are configured to route communications to and from network devices subnetwork 2. Routers 102(2) and 102(3) may be redundant gateway routers that each serve subnetwork 2. It should be further appreciated that FIG. 1A may comprise any number of routers and subnetworks. The topology of system 100 in FIG. 1A is merely an example.

In addition to routing communications to and from corresponding subnetworks, the routers 102(1)-102(3) are configured to communicate with each other by way of the private network 106. The private network 106 enables network devices in one subnetwork to exchange secure and encrypted communications (e.g., packets) with network devices in other subnetworks via one or more of the routers 102(1)-102(3). For example, administrators of subnetwork 1 and subnetwork 2 may require that network devices in subnetwork 1 and subnetwork 2 exchange only secure and encrypted communications with each other. Thus, network device 2 in subnetwork 2 may send a packet to router 102(2), and the router 102(2) may encapsulate the packet to ensure that the packet is encrypted and secure. Router 102(2) may then send the packet to router 102(1) across the private network 106. Router 102(1), upon receiving the encrypted packet, may decapsulate the packet and send it to an appropriate destination network device in subnetwork 1 (e.g., network device 1). These packet exchanges between the network devices in subnetworks via the private network 106 are also known as "service flows" or "service exchanges." The service flows traverse a network path in the private network 106. The private network 106 may also be referred to as a virtual private network (VPN) accessible over a Wide Area Network (WAN) (e.g., the Internet).

The routers 102(1)-102(3) are also configured to advertise routing information to each other in the VPN accessible over the WAN. This routing information may comprise, e.g., network path routes in Local Area Networks (LANs) or virtual LANs (VLANs) that are associated with each of the routers. For example, router 102(1) may advertise to router 102(2) and router 102(3) LAN routes associated with subnetwork 1. Likewise, router 102(2) and router 102(3) may advertise LAN routes associated with subnetwork 2 to router 102(1). For example, the routers 102(1)-102(3) may advertise a prefix corresponding to its subnetwork into the WAN. The routing advertisements may indicate preferred paths between network devices. These advertised routes are referred to generally hereinafter as "full routes" or "full routing information."

In one example, when router 102(1) receives the full routing information from routers 102(2) and 102(3), router 102(1) is able to send service flows originating from network device 1 in subnetwork 1 to network device 2 along an optimal network path indicated by the full routing information provided by router 102(2).

As described hereinafter, each of the routers 102(1)-102(3) is configured with state monitoring software 110 that enables the routers 102(1)-102(3) to conditionally advertise the full routing information to the other routers based on state information of a router. For example, as described by the techniques hereinafter, the routers 102(1)-102(3) may store state information indicative of whether or not the router has successfully registered with one or more of the key servers 108(1) and 108(2). This state information may be referred to hereinafter as "cryptostate information." FIG. 1A shows the full routing information advertised by the routers 102(1)-102(3) to each other at reference numerals 113(1)-113(3). The advertisements 113(1)-113(3) are also referred to as "conditional service route advertisements," since the route advertisements are conditional on the cryptostate information, as described herein.

In addition to conditionally advertising the full routing information, each of the routers 102(1)-102(3) is also configured to advertise address information to the other routers. For example, router 102(1) is configured to advertise its address information (e.g., its Internet Protocol (IP) address) to router 102(2) and 102(3), an likewise, router 102(2) may advertise its IP address to router 102(1) and 102(3), and router 102(3) may advertise its IP address to router 102(1) and 102(2). This address advertising is also sent by the routers 102(1)-102(3) to the key servers 108(1) and 108(2). The address advertising is also referred to hereinafter as "bootstrap advertising" or "bootstrap routing information." The bootstrap routing information enables control messages to be exchanged in the VPN. As will become apparent hereinafter, the bootstrap advertising is not conditional and does not depend on the cryptostate information of a router. The bootstrap routing information advertisements by routers 102(1)-102(3) are shown at 114(1)-114(3). The bootstrap routing information advertisements are also referred to hereinafter as "unconditional control route advertisements," since these routes are not conditional on the cryptostate information.

As stated above, FIG. 1A shows a plurality of key servers, for example, two key servers 108(1) and 108(2). The routers 102(1)-102(3) are configured to exchange communications with the key servers 108(1) and 108(2) across the private network 106. The key servers 108(1) and 108(2) are devices (or processes) that periodically generate and distribute cryptographic keys ("keys") to the routers 102(1)-102(3). These keys comprise keying materials and policies that may be shared between multiple routers. For example, the keys may have security associations (or SAs) that are shared security attributes that the key servers 108(1) and 108(2) can provide to multiple routers. FIG. 1A shows two key servers, for example, sharing responsibilities for assigning cryptographic keys. It should be appreciated, however, that the system 100 may have any number of key servers.

The SAs distributed by the key servers 108(1) and 108(2) to the routers 102(1)-102(3) can contain a simple set of policies and associated keys or policies that specify the use of related keying materials using a key generation system. In one example, the key servers 108(1) and 108(2) are configured to obtain security policy information that describes which routers in the system 100 are to become members of the same VPN. The key servers 108(1) and 108(2) use the cryptographic keys to define router devices to be members of a VPN.

For example, the key servers 108(1) and 108(2) send the same cryptographic keys, with the shared SAs, to the routers that are part of the same VPN. The key servers 108(1) and 108(2) may periodically distribute a group key to all of the routers that are determined to become members of a same VPN. In other words, routers that are part of the same VPN receive the same cryptographic keys comprising shared SAs from either key server 108(1) or key server 108(2) (or both).

In FIG. 1A, the routers 102(1)-102(3) are part of the same VPN, and thus, the routers 102(1)-102(3) receive the same group key comprising the same SAs from either key server 108(1) or 108(2). Thus, upon receiving the same group key, the routers 102(1)-102(3) are said to be synchronized with each other in a crypto-plane of the routers. Additionally, when the routers 102(1)-102(3) send the full routing information to each other, the routers are said to be synchronized with each other in a routing-plane of the routers. In order for service flows between network devices in a VPN to be successful, routers need to be synchronized in both the crypto-plane and the routing-plane. For example, FIG. 1A shows the service flow 112 between network device 1 and network device 2, and when the routers 102(1)-102(3) in the VPN are synchronized in both the crypto-plane and the routing-plane, secure communications can be exchanged between network device 1 and network device 2. The key servers 108(1) and 108(2) may distribute a different group key to other routers (not shown in FIG. 1A) in the system 100 to create another VPN group. Likewise, the key servers 108(1) and 108(2) may distribute a different group key to some but not all of the routers 102(1)-102(3) to create a different VPN, such that these routers may be members of both the private network 106 shown in FIG. 1 and another VPN.

Routers that are part of the same VPN are referred to as "group members" of the VPN. As stated above, in FIG. 1A, routers 102(1)-102(3) are group members of the same VPN (i.e., private network 106). Router 102(1) may be referred to as "group member 1" or "GM 1," router 102(2) may be referred to as "group member 2" or "GM 2," and so on. Group members are also referred to as peer routers, and for example, GM 1, GM 2 and GM 3 are all group peer routers. For example, GM 1 receives a packet from network device 1 in subnetwork 1 and encrypts the packet by encapsulating it in a format that is capable of being decapsulated by other group members (e.g., GM 2 and GM 3). GM 1 then sends the encapsulated packet to the appropriate router in the VPN (private network 106) to be decapsulated and sent to the destination network device in another subnetwork (e.g., network device 2 in subnetwork 2). GM 1 sends the encapsulated packet along the appropriate network path as defined by the full routing information provided to it by GM 2 and GM 3. Likewise, upon receiving an encapsulated packet from another group member in the VPN, GM 1 can decapsulate the packet and send the decapsulated packet to the appropriate network device in subnetwork 1. Thus, the GM 1 is said to "protect" network devices in subnetwork 1, since GM 1 ensures that packets sent by the network devices in subnetwork 1 are securely transmitted to other group members in the VPN. Similarly, GM 2 and GM 3 protect network devices in subnetwork 2.

The key servers 108(1) and 108(2) may distribute the keys to the group members using, e.g., key exchanges described by the Internet Key Exchange (IKE) protocol. In one example, the IKE protocol is described in the Request for Comments (RFC) 2409 by the Internet Engineering Task Force (IETF). Furthermore, IETF RFC 6407 describes a Group Domain of Interpretation (GDOI) protocol for techniques of a key server distributing a group key to group members. These protocols are merely examples, and other group key distribution protocols known or contemplated may be used to enable the key servers 108(1) and 108(2) to distribute group keys to group members of a VPN. In one example, the techniques described herein are applicable for optimizing secure communications in networks that use the GDOI protocol.

Once the routers 102(1)-102(3) have received the group key, the routers 102(1)-102(3) are admitted as group members to the VPN. However, membership to a VPN can change over time, and the key servers 108(1) and 108(2) may periodically send new group keys with new SAs to the group members to ensure their membership in a VPN. For example, each key that is sent to the group members may have an expiration lifetime. In order to remain as group members to a VPN, routers need to obtain new keys from the key server 108(1) or 108(2). After the key expires, group members of a VPN will not be able to exchange communications with each other using the expired key, since the group members will be unable to perform encryption and decryption operation on the packets exchanged between each other. However, there may be scenarios where one or more of the routers 102(1)-102(3) may not have received the new key from key server 108(1) or 108(2). Additionally, there may be scenarios where one or more of the routers 102(1)-102(3) may not receive the initial key that established the VPN. Thus, whenever a group member of the VPN fails to receive a key from key server 108(1) or 108(2) or fails to be authenticated by the key server 108(1) or 108(2), the group member is said to be out-of-sync or unsynchronized in the crypto-plane with the other group members that have received the key and that have been authenticated. As a group VPN scales and as more routers are added as group members to the group VPN, the likelihood increases that the group members of a group VPN may become unsynchronized in the crypto-plane. This lack of synchronization in the crypto-plane may result in communication disruptions between network devices.

Figure 1B:
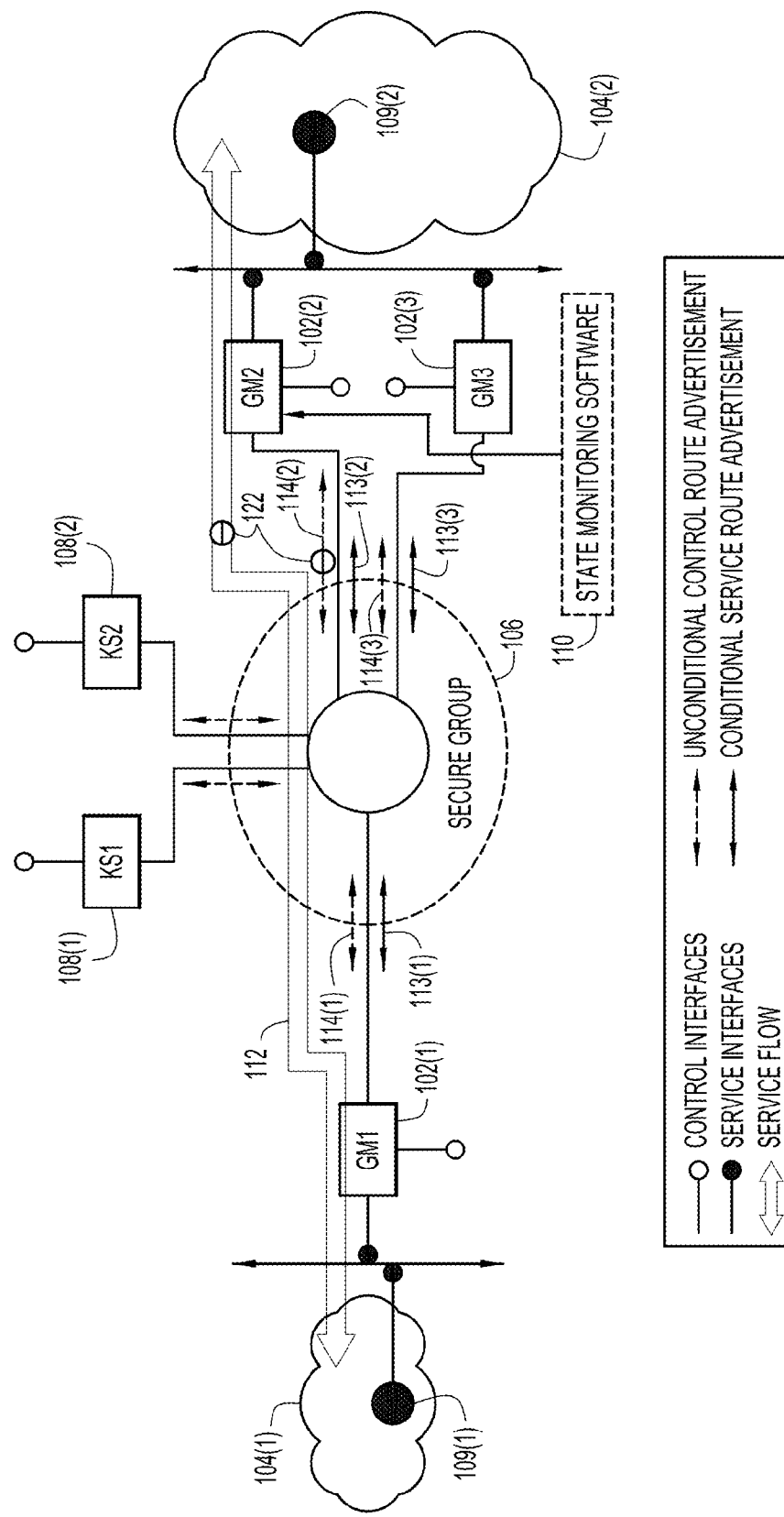

Referring now to FIG. 1B, an example of the system 100 is shown when one or more of the group members is out-of-sync in the crypto-plane. FIG. 1B shows the same components as the system 100 described in FIG. 1A, with GM 2 out-of-sync in the crypto-plane with GM 1 and GM 3. As stated above, in order to exchange communications in the service flow 112 with each other, the group members of the VPN must be synchronized in both the crypto-plane and the routing-plane. In existing VPN environments, however, the crypto-plane and the routing-plane for each of the group members are independent from each other. That is, in existing VPN environments, it is possible for a group member to be unsynchronized with other group members in the VPN in the control plane (e.g., the crypto-plane) while being synchronized with the other group members in the VPN in the service plane (e.g., the routing-plane) or data plane. Likewise, in existing VPN environments, it is possible for a group member to be synchronized with the other group members in the control plane and unsynchronized with the group members in the service place or data plane. In the scenario in which a group member is unsynchronized with other group members of a VPN in the routing-plane but synchronized with the group members in the crypto-planes, the group member will not be able to exchange communications with the other group members since no routing information associated with the group member is distributed to the other group members.

However, in the scenario where a group member is unsynchronized with other group members in crypto-plane but is synchronized with group members in the routing-plane, a persistent communication black hole may exist. For example, in this scenario, GM 1, GM 2 and GM 3 may advertise the full routing information and the bootstrap routing information to each other. The full routing information, e.g., comprises routing adjacencies for the respective subnetworks and preferred network paths between subnetworks associated with group members. GM 2, however, may fail to authenticate with one of the key servers 108(1) and 108(2), as shown at reference numeral 122. In other words, GM 2 may experience a failure in its crypto-plane. Thus, when network device 1 sends a communication destined for network device 2, and if the preferred network path between network device 1 and network device 2 includes GM 2, GM 1 will send to GM 2 secure encrypted packets (depicted in service flow 112) originating from network device 1 and destined for network device 2. GM 2, however, has failed to authenticate with one of the key servers 108(1) or 108(2), and thus, though GM 2 receives the packets, GM 2 is unable to decrypt the packets. As a result, GM 2 will drop the packets. For subsequent communications, GM 1 will still send packets to GM 2 without knowing or being informed that GM 2 is unsynchronized in the crypto-plane with it and the other group members in the VPN. Additionally, for other service flows in the VPN that involve GM 2, GM 2 will drop packets instead of delivering the packets to the appropriate destination device in subnetwork 2. In one example, GM 2 may be unsynchronized after losing a group encryption key previously received from one of the key servers 108(1) or 108(2). Thus, as shown at reference numeral 122, the service flow between network device 1 and network device 2 is disrupted.

The techniques described herein alleviate these drawbacks. In particular, the techniques described herein enable synchronization between applications in a control-plane and applications in a service-plane for a router. The description provided herein uses cryptostate applications (e.g., registering with a key server) as an example of a control-plane application and routing applications as an example of a service-plane application, though it should be appreciated that the techniques herein maybe applicable to other control-plane applications and service-plane applications. For example, the techniques described herein may be applicable to synchronization between control-plane applications (such as cryptostate applications) and other service-plane applications, such as compression applications, transcoding applications, etc. For simplicity, the synchronization techniques are described herein with respect to cryptostate applications as the control-plane application and routing applications as the service-plane application. It should be appreciated that the term "crypto-plane" as used herein describes cryptographic applications (e.g., registering with a key server) that occur in the control-plane and the "routing-plane" as used herein describes routing applications that occur in the service-plane.

Figure 1C:
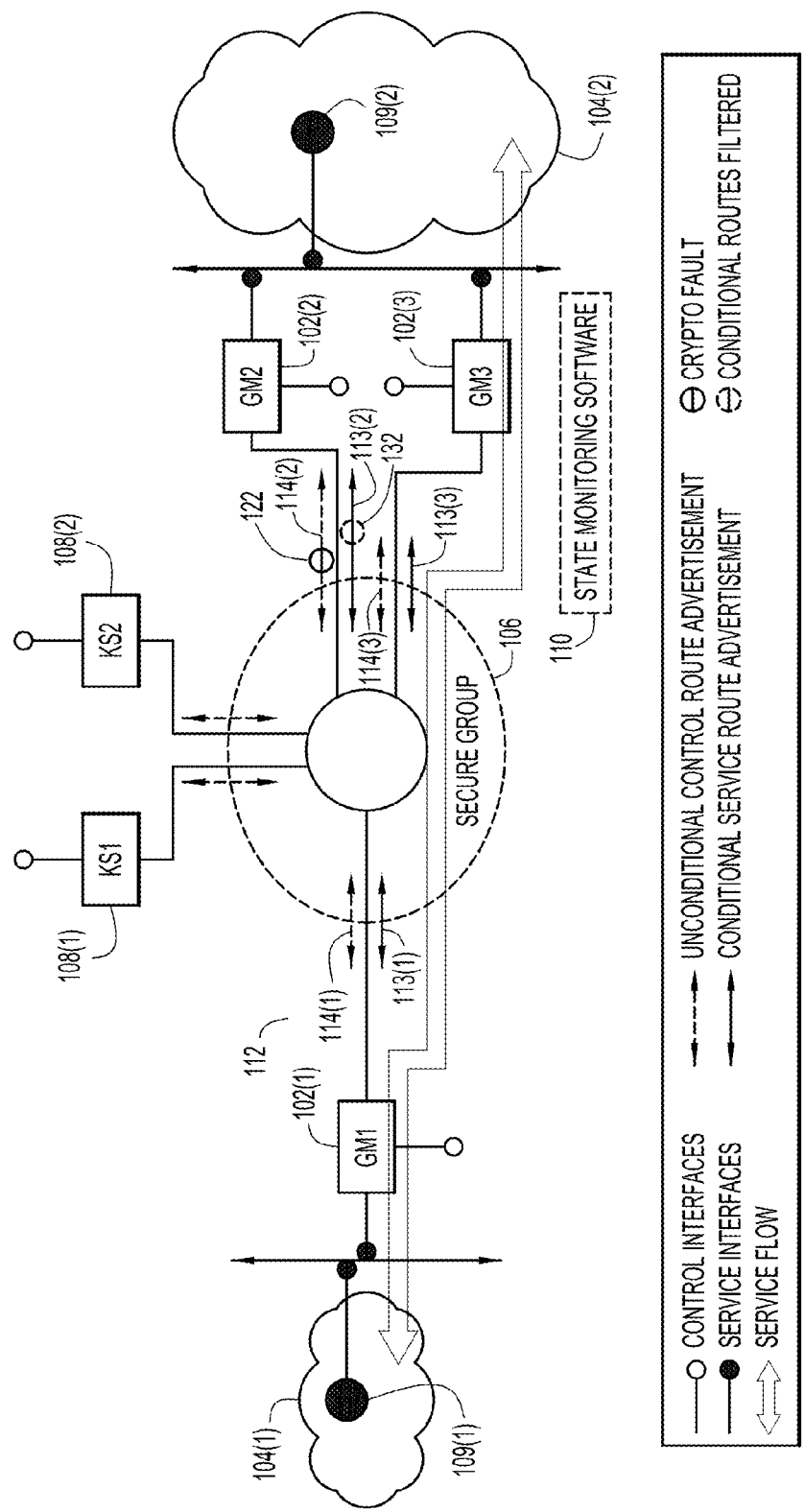

Reference is now made to FIG. 1C. FIG. 1C shows an example of GM 2 enabling modified service flow operations in response to the synchronization between the crypto-plane and the routing-plane. The system 100 in FIG. 1C has the same components as system 100 in FIGS. 1A and 1B. In FIG. 1C, GM 2 experiences a crypto-plane failure 122 (e.g., no security policies are installed on GM 2). For example, GM 2 may not have received a key from either of the key servers 108(1) and 108(2), a previous key distributed to GM 2 may have expired without GM 2 receiving a new key and/or GM 2 may experience crypto-engine failures. Unlike present VPN environments, however, GM 2 does not advertise the full routing information in the event of a crypto-plane failure. Instead GM 2 will monitor the cryptostate of its own crypto-plane, and based on the cryptostate information, GM 2 will conditionally advertise the full routing information. Thus, in FIG. 1C, as shown at reference numeral 132, since GM 2 experienced a crypto-plane failure 122, GM 2 filters the routing advertisement 113(2) (e.g., the fully routing information for GM 2). That is, GM 2 does not send the full routing information to the other group members, since it is not synchronized in the crypto-plane. As a result, the other group members do not receive the full routing information from GM 2, and accordingly, the other group members cannot send communications in the VPN to GM 2 since the other group members do not have any routing information associated with GM 2. Thus, the persistent "black hole" problem is solved since communications that would have otherwise been dropped by GM 2 are no longer sent to GM 2 by the other group members. Thus, the crypto-plane and routing-plane of GM 2 are synchronized with each other due to GM 2 monitoring its own cryptostate. In one example, the filtering depicted at 132 in FIG. 1C is a bidirectional filtering of the routes advertised from GM 2 and accepted by GM 2 from the other group members. The filtering is accomplished automatically by GM 2 without any additional configuration to GM 2 required. Since the full routing information of GM 2 is filtered from being received by the other group members, a new service flow, shown at 134, between network device 1 and network device 2 traverses a different network path (e.g., via GM 3 and another group member, not shown in FIG. 1C, that services or protects network devices in subnetwork 2). In other words, when the full routing information of GM 2 is not advertised to the other group members, the other group members remove GM 2 from a network path for service flows in the VPN.

Figure 2:
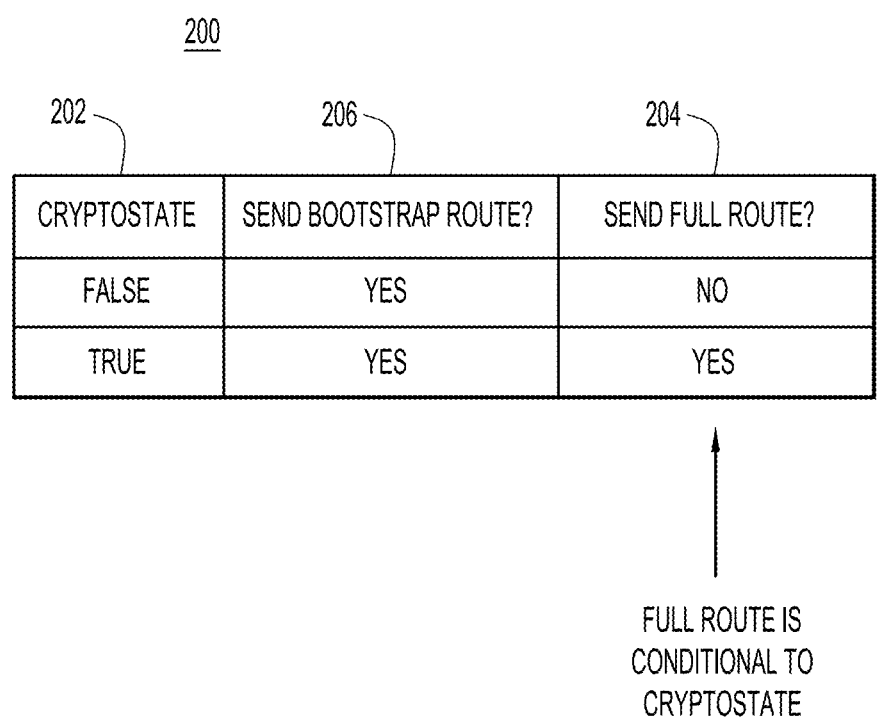
FIG. 2 shows an example database accessible by a router to determine state information indicative of whether or not the router has successfully registered with a key server, according to an example embodiment.

Reference is now made to FIG. 2. FIG. 2 shows an example state database 200 accessible by GM 2 to determine the cryptostate information. In one embodiment, the database 200 may, for example, be stored in memory at GM 2. In another embodiment, the database 200 may be stored remotely and may be accessible by GM 2. The database 200 maintains the cryptostate information, shown at reference numeral 202. In one example, the cryptostate information comprises state information (e.g., a Boolean state) that is indicative of whether or not the router has successfully registered with the key server. A "False" cryptostate indicates that the router has not successfully registered with one or more of the key servers 108(1) and 108(2). A "True" cryptostate indicates that the router has successfully registered with one or more of the key servers 108(1) and 108(2). As shown at 204, the cryptostate of GM 2 determines whether or not full routing information of GM 2 is sent to the other group members. That is, when the cryptostate is False, GM 2 does not send its full routing information to the other group members in the VPN, and likewise, GM 2 does not receive the full routing information from the other group members. On the other hand, when the cryptostate is True, GM 2 does send its full routing information to the other group members and receives the full routing information from the other group members.

As shown at 206, GM 2 will always advertise its bootstrap routing information, regardless of the cryptostate. Thus, if GM 2 has not successfully registered with the key server, GM 2 will advertise only its bootstrap routing information and not its full routing information. The bootstrap routing information enables GM 2 to send and receive communications with the key server. Thus, even if GM 2 does not advertise its full routing information, by advertising its bootstrap information, GM 2 may later successfully register with one of the key servers 108(1) and 108(2). Upon such successful registration, GM 2 changes its cryptostate from False to True, and GM 2 advertises its full routing information. Thus, by monitoring its cryptostate, GM 2 can synchronize its crypto-plane and routing-plane to conditionally advertise its full routing information when appropriate (e.g., when the cryptostate is True). As stated above, the synchronization between the control-plane and the service plane may enable the other group members to determine whether or not to execute other applications, based on the control-pane information (e.g., the cryptostate information). Thus, when the cryptostate of GM 2 is False, GM 2 may prevent information from being sent to the other group members to prevent to other group members from performing compression applications, transcoding applications, etc. involving GM 2. In one embodiment, GM 2 may send its cryptostate information to the other group members such that the other group members can filter network paths that involve GM 2.

In general, GM 2 may use any tracking mechanism to monitor its cryptostate. Additionally, GM 2 may use any route-filtering mechanism to conditionally filter its full routing information based on the cryptostate information. As an illustration, GM 2 may store the cryptostate information as an object tracking field (e.g., enhanced-object-track (EOT) field)). For example, the following logical sequence may represent the object tracking field information If GM [registration|Group VPN data plane health]=true
Trigger routing update to store network full visibility
Else
Trigger routing update to disable network full visibility
In the above logical sequence, the routing visibility of all of the routers 102(1)-102(3) is always active or "on." Additionally, the Group VPN data plane health (e.g., whether there is synchronization in the data plane) is determined by using an internal process that determines, using a Boolean operation, whether or not the input is TRUE.

In the above logical sequence, the "track 99" field is used by GM 2 to monitor the cryptostate. When GM 2 has a True cryptostate, the "track 99" field will return a "True" value. Under this condition, GM 2 will advertise and receive the following routes:

Outbound routes to reach the registration interface of GM 2 and routes permitted by "orig_route_map_acl_out"

Inbound routes to reach the Network Operating Center (NOC) and all routes permitted by "orig_route_map_acl_in" received from other group members When GM 2 has a False cryptostate, the track 99 filed will return a "False" value. Under this condition, GM 2 will advertise and receive the following routes only:

Outbound routes to reach the registration interface of GM 2

Inbound routes to reach the NOC subnetwork

Thus, when a crypto-plane failure event occurs (i.e., when the cryptostate is False), GM 2 maintains reachability only with respect to key servers 108(1) and 108(2) via the VPN in the NOC and the registration interface of GM 2. In this scenario, GM 2 does not maintain reachability with respect to the other group members in the VPN. It should be appreciated that any of the group members GM 1 to GM 3 may perform these cryptostate monitoring and conditional route advertising operations, and GM 2 is used herein merely as an example.

Figure 3:
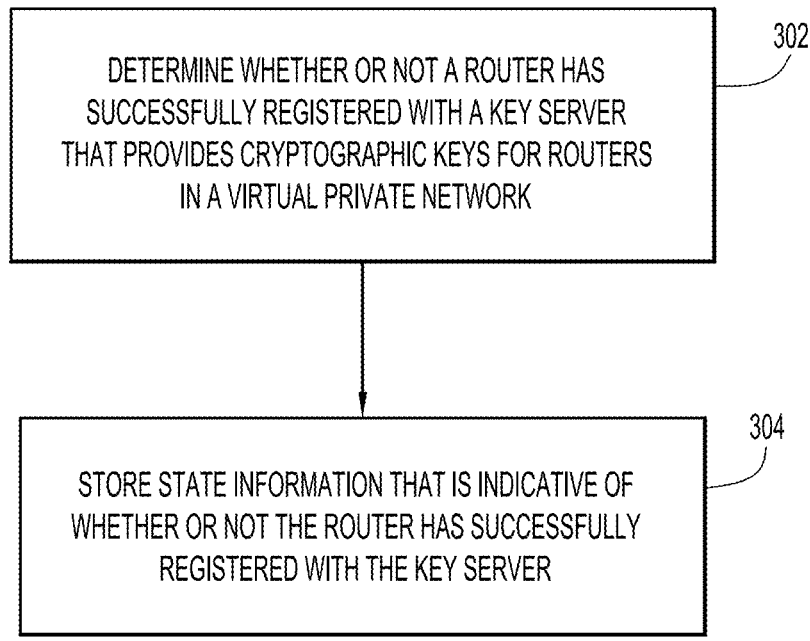
FIG. 3 shows an example flow chart depicting operations of the router monitoring its state information, according to an example embodiment.

Reference is now made to FIG. 3. FIG. 3 shows an example flow chart 300 depicting operations of the GM 2 monitoring its cryptostate information. At 302, a router in the VPN (e.g., GM 2) determines whether or not it has successfully registered with a key server (e.g., key server 108(1) or 108(2)) that provides cryptographic keys for routers in the VPN. At 304, GM 2 stores state information (e.g., cryptostate information) that is indicative of whether or not the router has successfully registered with the key server.

Figure 4:
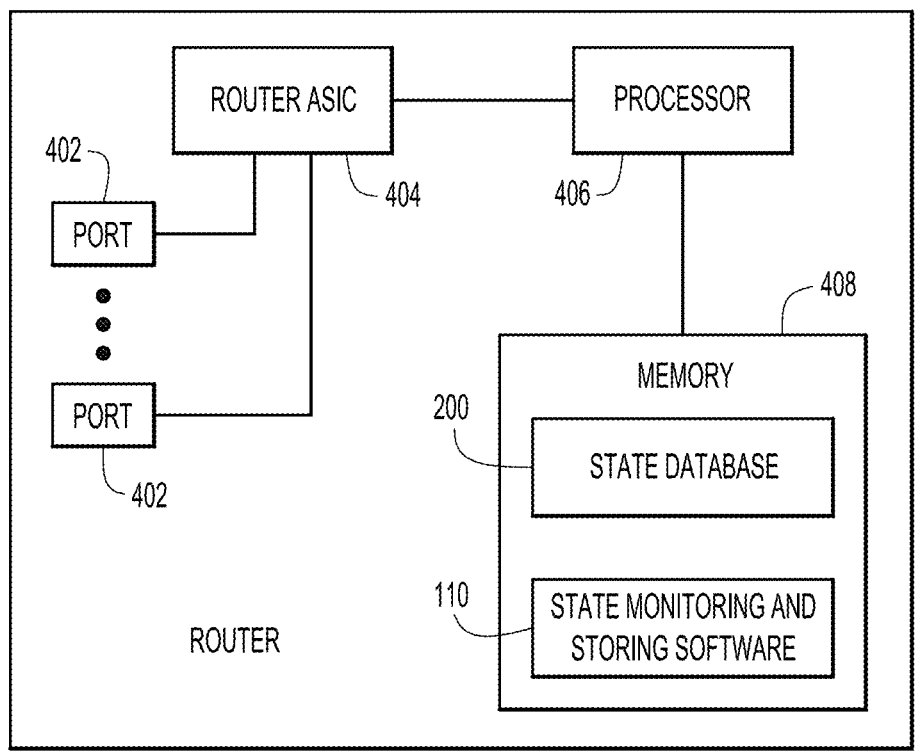
FIG. 4 shows an example block diagram of the router configured to monitoring its state information and conditionally advertising routing information, according to an example embodiment.

Reference is now made to FIG. 4. FIG. 4 shows an example block diagram of a router 102 configured to monitor its cryptostate information and to conditionally advertise routing information based on the cryptostate information. It should be appreciated that the router 102 may be any of the group members GM 1 to GM 3. For simplicity, the router in FIG. 4 is referred to generally as router 102. The router device 102 comprises, among other components, a plurality of ports 402, a router processing unit, e.g., a router application specific integrated circuit (ASIC) 404, a processor 406 and a memory 408. The ports 402 receive communications (e.g., packets) from network devices and are configured to send communications to network devices. The ports 402 are coupled to the router ASIC 404. The router ASIC 404 receives instructions from the processor 406 and forwards packets to appropriate port units 402 for transmission to a destination network device. The router ASIC 404 is coupled to the processor 406. The processor 406 is, for example, a microprocessor or microcontroller that is configured to execute program logic instructions (i.e., software) for carrying out various operations and tasks of the router 102, as described above. For example, the processor 406 is configured to execute state monitoring and storing software 110 to monitor its cryptostate and conditionally advertise routing information according to the techniques described above. The functions of the processor 406 may be implemented by logic encoded in one or more tangible computer readable storage media or devices (e.g., storage devices compact discs, digital video discs, flash memory drives, etc. and embedded logic such as an application specific integrated circuit, digital signal processor instructions, software that is executed by a processor, etc.).

The memory 408 may comprise read only memory (ROM), random access memory (RAM), magnetic disk storage media devices, optical storage media devices, flash memory devices, electrical, optical, or other physical/tangible (non-transitory) memory storage devices. The memory 408 stores software instructions for the state monitoring and storing software 110. The memory 408 also stores the state database 200. Thus, in general, the memory 408 may comprise one or more computer readable storage media (e.g., a memory storage device) encoded with software comprising computer executable instructions and when the software is executed (e.g., by the processor 406) it is operable to perform the operations described for the state monitoring and storing software 110. The state database 200 alternatively may be maintained by the router ASIC 404.

The state monitoring and storing software 110 may take any of a variety of forms, so as to be encoded in one or more tangible computer readable memory media or storage device for execution, such as fixed logic or programmable logic (e.g., software/computer instructions executed by a processor), and the processor 406 may be an ASIC that comprises fixed digital logic, or a combination thereof For example, the processor 406 may be embodied by digital logic gates in a fixed or programmable digital logic integrated circuit, which digital logic gates are configured to perform the state monitoring and storing software 110. In general, the state monitoring and storing software 110 may be embodied in one or more computer readable storage media encoded with software comprising computer executable instructions and when the software is executed operable to perform the operations described hereinafter.

It should be appreciated that the techniques described above in connection with all embodiments may be performed by one or more computer readable storage media that is encoded with software comprising computer executable instructions to perform the methods and steps described herein. For example, the operations performed by the routers, key server and network devices may be performed by one or more computer or machine readable storage media (non-transitory) or device executed by a processor and comprising software, hardware or a combination of software and hardware to perform the techniques described herein.

In summary, a method comprising: at a router in a virtual private network, determining whether or not the router has successfully registered with a key server that provides cryptographic keys for routers in the virtual private network; and storing state information that is indicative of whether or not the router has successfully registered with the key server.

In addition, an apparatus is provided comprising: a plurality of ports configured to send and receive messages in a network; a router processing unit coupled to the ports and configured to determine how to route traffic received at the ports in the network; and a processor coupled to the router processing unit, and configured to: determine whether or not the apparatus has successfully registered with a key server that provides cryptographic keys for routers in a virtual private network; and store state information that is indicative of whether or not the apparatus has successfully registered with the key server.

Furthermore, a computer-readable storage medium provided that is encoded with software comprising computer executable instructions and when the software is executed operable to: determine whether or not a router in a virtual private network has successfully registered with a key server that provides cryptographic keys for routers in the virtual private network; and store state information that is indicative of whether or not the router has successfully registered with the key server.

The above description is intended by way of example only. Various modifications and structural changes may be made therein without departing from the scope of the concepts described herein and within the scope and range of equivalents of the claims.

What is claimed is:

1. A method comprising:
   at a router in a virtual private network, synchronizing routing operations with cryptographic operations of the router by:
   determining whether or not the router has successfully registered with a key server that provides cryptographic keys for routers in the virtual private network; and
   storing state information that is indicative of whether or not the router has successfully registered with the key server; and
   advertising bootstrap routing information in the virtual private network that enables the router to send and receive communications with the key server, wherein advertising comprises advertising only the bootstrap routing information and not full routing information in the virtual private network if the router has not successfully registered with the key server.

2. The method of claim 1, wherein advertising only the bootstrap routing information and not the full routing information in the virtual private network causes other routers in the virtual private network to remove the router from a network path for communications in the virtual private network.

3. The method of claim 1, further comprising advertising full routing information including subnetwork routing information associated with the router if the router has successfully registered with the key server.

4. The method of claim 3, wherein the subnetwork routing information comprises one or more of local area network or virtual local area network routing information.

5. A method comprising:
   at a router in a virtual private network, synchronizing routing operations with cryptographic operations of the router by:
   determining whether or not the router has successfully registered with a key server that provides cryptographic keys for routers in the virtual private network;
   storing state information that is indicative of whether or not the router has successfully registered with the key server;
   depending on the state information, advertising to other routers full routing information indicating preferred paths between network devices; and
   sending the state information to the other routers in the virtual private network to cause the other routers in the network to determine whether or not to execute one or more applications based on the state information.

6. The method of claim 5, wherein the one or more applications comprise at least one of a compression application, transcoding application or routing application.

7. The method of claim 5, wherein sending comprises sending the state information to the other routers in the virtual private network such that the other routers in the virtual private network do not execute the one or more applications if the state information indicates that the router has not successfully registered with the key server.

8. The method of claim 1, wherein storing comprises storing the state information in an object tracking field.

9. An apparatus comprising:
   a plurality of ports configured to send and receive messages in a network;
   a router processing unit coupled to the ports and configured to determine how to route traffic received at the ports in the network; and
   a processor coupled to the router processing unit, and configured to synchronize routing operations with cryptographic operations of the apparatus by:
   determining whether or not the apparatus has successfully registered with a key server that provides cryptographic keys for routers in a virtual private network;
   storing state information that is indicative of whether or not the apparatus has successfully registered with the key server; and
   generating a message that is configured to advertise bootstrap routing information in the virtual private network that enables the apparatus to send and receive communications with the key server, wherein the message to advertise only the bootstrap routing information and not full routing information in the virtual private network is generated if the apparatus has not successfully registered with the key server.

10. The apparatus of claim 9, wherein the processor is further configured to generate the message to advertise full routing information including subnetwork routing information associated with the apparatus if the apparatus has successfully registered with the key server.

11. The apparatus of claim 9, wherein the processor is further configured to cause the state information to be sent to other routers in the virtual private network in order to cause the other routers in the network to determine whether or not to execute one or more applications based on the state information.

12. A non-transitory computer-readable storage media encoded with software comprising computer executable instructions and when the software is executed operable to synchronize routing operations with cryptographic operations of a router in a virtual private network by:
   determining whether or not the router in the virtual private network has successfully registered with a key server that provides cryptographic keys for routers in the virtual private network;
   storing state information that is indicative of whether or not the router has successfully registered with the key server; and
   advertising bootstrap routing information in the virtual private network that enables the router to send and receive communications with the key server, wherein advertising comprises advertising only the bootstrap routing information and not full routing information in the virtual private network if the router has not successfully registered with the key server.

13. The non-transitory computer-readable storage media of claim 12, further comprising instructions operable to advertise full routing information including subnetwork routing information associated with the apparatus if the apparatus has successfully registered with the key server.

14. The non-transitory computer-readable storage media of claim 13, wherein the subnetwork routing information comprises one or more of local area network or virtual local area network routing information.

15. The non-transitory computer-readable storage media of claim 12, wherein advertising only the bootstrap routing information and not the full routing information in the virtual private network causes other routers in the virtual private network to remove the router from a network path for communications in the virtual private network.

16. The non-transitory computer-readable storage media of claim 12, further comprising instructions operable to:
   depending on the state information, advertising to other routers full routing information indicating preferred paths between network devices; and
   sending the state information to the other routers in the virtual private network to cause the other routers in the network to determine whether or not to execute one or more applications based on the state information.

17. The non-transitory computer-readable storage media of claim 16, wherein the one or more applications comprise at least one of a compression application, transcoding application or routing application.

18. The non-transitory computer-readable storage media of claim 16, wherein sending comprises sending the state information to the other routers in the virtual private network such that the other routers in the virtual private network do not execute the one or more applications if the state information indicates that the router has not successfully registered with the key server.

19. The non-transitory computer-readable storage media of claim 12, wherein storing comprises storing the state information in an object tracking field.

* * * * *